United States Patent
Wu et al.

(10) Patent No.: US 8,054,786 B2
(45) Date of Patent: Nov. 8, 2011

(54) RECEIVING MULTI-FREQUENCY DATA IN HIGH SPEED DOWNLINK PACKET ACCESS SERVICE

(75) Inventors: Song Wu, Shanghai (CN); Xian Liu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 929 days.

(21) Appl. No.: 11/965,615

(22) Filed: Dec. 27, 2007

(65) Prior Publication Data
US 2008/0165724 A1 Jul. 10, 2008

Related U.S. Application Data

(63) Continuation of application No. PCT/CN2006/000792, filed on Apr. 26, 2006.

(30) Foreign Application Priority Data

Jun. 27, 2005 (CN) .......................... 2005 1 0079917

(51) Int. Cl.
*H04W 72/04* (2009.01)
*H04W 76/02* (2009.01)

(52) U.S. Cl. ........ 370/329; 370/468; 370/278; 370/280; 370/281; 455/450

(58) Field of Classification Search .................. 370/254, 370/278, 280, 281, 328, 329, 336, 342, 343, 370/344, 345, 347, 349, 431, 436, 437, 441, 370/442, 468, 478, 479, 480; 455/450, 452.1, 455/452.2
See application file for complete search history.

(56) References Cited

U.S. PATENT DOCUMENTS

| | | | |
|---|---|---|---|
| 6,212,388 B1 * | 4/2001 | Seo ............................... | 455/450 |
| 7,551,546 B2 * | 6/2009 | Ma et al. ....................... | 370/208 |
| 2004/0063436 A1 * | 4/2004 | Braun et al. .................. | 455/450 |
| 2004/0063437 A1 * | 4/2004 | Braun et al. .................. | 455/450 |
| 2006/0098567 A1 * | 5/2006 | Willenegger et al. ......... | 370/206 |

* cited by examiner

*Primary Examiner* — Chi Pham
*Assistant Examiner* — Ahmed Elallam
(74) *Attorney, Agent, or Firm* — Hamre, Schumann, Mueller & Larson, P.C.

(57) ABSTRACT

A technique for receiving multi-frequency data in a high speed downlink access service is disclosed. In this manner, one or more deficiencies of current HSDPA technology are mitigated, such as where user equipment (UE) can merely be scheduled by the network side at a single frequency. Among other things, a control channel set and a list of frequencies for user equipment (UE) are exchanged between a network side and UE accessing the network.

9 Claims, 5 Drawing Sheets

--Prior Art--

RECEIVING MULTI-FREQUENCY DATA IN HIGH SPEED DOWNLINK PACKET ACCESS SERVICE

REFERENCE TO RELATED APPLICATION(S)

This application is a continuation of PCT/CN2006/000792, filed Apr. 26, 2006, that claims the benefit of the priority date of Chinese Patent Application No. 200510079917.6, filed on Jun. 27, 2005, the contents of both of which are herein incorporated by reference in their entireties.

FIELD

The disclosure herein relates to mobile communication technology, and more particularly to receiving multi-frequency data in a high speed downlink access service.

BACKGROUND

High speed downlink packet access (HSDPA) technology is a new technology introduced by 3GPP (3rd Generation Partnership Project) in Release 5, which can improve a data transmission rate in a downlink direction of the packet service and can improve a frequency utilization ratio of the system. According to the HSDPA technology, multiple users share code channel resources and a higher rate is allocated to a UE (user equipment) with a good channel environment and a lower rate is allocated to a UE with a bad channel environment by the AMC (Adaptive Modulation and Coding)) and HARQ (Hybrid Automatic Repeat Request) technologies. The HSDPA technology is also adaptable to three different modes of WCDMA FDD (Wideband Code Division Multiple Access-Frequency Division Duplex), UTRA TDD (Universal Telecommunication Radio Access Time Division Duplex) and TD-SCDMA (Time Division-Synchronous Code Division Multiple Access).

For the UE working at a single frequency, when the data transmission is performed with the HSDPA technology, the HS-DSCH (High Speed Downlink Shared Channel) is used to carry high layer data and the data on the HS-DSCH are mapped to a HS-PDSCH (High Speed Physical Downlink Shared Channel) to be transmitted after being coded and interleaved; the UE interacts with the network about the control information through a HS-SCCH (High Speed Shared Control Channel) and a HS-SICH (High Speed Shared Information Channel)/HS-DPCCH (High Speed Dedicated Physical Control Channel). The HS-SCCH corresponds to the HS-SICH one by one and a plurality of pairs of HS-SCCH/HS-SICH can be allocated in one cell but one UE at most needs to concurrently monitor 4 HS-SCCHs.

During the communication process, in the TDD system, when the network side has data to be transmitted to some UE at some time through a scheduling algorithm, the network side selects one HS-SCCH from a set of HS-SCCHs allocated to the UE and transmits information related to the data transmitted to the UE to the UE, wherein the information generally comprises number of code channels of HS-PDSCH to be received, number of time slots, indicator of data length, adopted modulation mode, RV version and indicator flag of new data etc. and the UE receives and processes the HS-PDSCH according to the control information of the HS-SCCH, replies the ACK/NACK and CQI (channel quality indicator) to the network side through the HS-SICH and the network side controls the subsequent transmission of data to the UE according to the information.

FIG. 1 illustrates an interaction flow of data transmission according to the HSDPA technology between the UE and the network side at the single frequency in a conventional TDD system.

1. A RNC (Radio Network Controller) configures related resources of HS-PDSCH/HS-SCCH/HS-SICH (comprising information of code channel, time slot, midamble etc.) for a Node B through a physical shared channel reconfiguration request according to network planning;

2. When a UE supporting the HSDPA accesses the network, it reports a service request and its capability to the network side;

3. When the RNC at the network side determines the access is allowed according to the requested service type and the capability of the UE, it transmits the capability of the UE to the Node B and requests the Node B to allocate resources for the UE, comprising a set of HS-SCCH/HS-SICH to be monitored by the UE;

4. The Node B allocates related shared resources for the UE, such as the set of HS-SCCH/HS-SICH, and transmits the information to the RNC;

5. The RNC transmits related shared resources allocated for the UE to the UE;

6. During the realtime communication, when the Node B transmits data to the UE at some time according to the scheduling algorithm, it selects one HS-SCCH from the set of the HS-SCCH/HS-SICH monitored by the UE to indicate the related control information of the HS-PDSCH carrying data, transmits the coded and multiplexed HS-SCCH to the UE and maps the processed data to the corresponding HS-PDSCH according to the timing relation and transmits to the UE;

7. The UE monitors the HS-SCCHs in the monitored set of HS-SCCH/HS-SICH and when it receives the HS-SCCH and after the decoding processing, it determines the HS-PDSCH data to be received, receives the HS-PDSCH data according to the control information transmitted on the HS-SCCH, and transmits a reply message (such as NACK/ACK) through the HS-SICH corresponding to the HS-SCCH to the Node B according to the decoding result (when the decoding data is right, ACK is replied, when the decoding data is wrong, NACK is replied; CQI is the channel quality indicator).

The current HSDPA technology operates on a single frequency cell and the UE supporting the single frequency. The network side interchanges the control information with the UE through the shared control channel and the network side notifies the UE through the HS-SCCH about whether to receive the subsequent HS-PDSCH, length of data and modulation mode on the HS-PDSCH, and redundancy version etc.; the UE replies the NACK/ACK and the CQI to the network side through the HS-SICH (for the TDD system) or the HS-DPCCH (for the FDD system). However, for the UE supporting multiple frequencies, when it operates in a multi-frequency cell, the data can be concurrently transmitted at multiple frequencies, but the UE can not be controlled to receive data at multiple frequencies.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for receiving multi-frequency data in a high speed downlink access service is disclosed. In this manner, one or more deficiencies of current HSDPA technology are mitigated, such as where user equipment (UE) can merely be scheduled by the network side at a single frequency.

An exemplary method for receiving multi-frequency data in a high speed downlink access service comprises allocating a control channel set and a list of frequencies for user equipment (UE) at a network side when the UE accesses the network, the control set and the list of frequencies used in a HSDPA service in a current cell according to the capability of the UE and the network resource; transmitting control information of a HS-PDSCH corresponding to working frequencies to the UE through multiple downlink shared control channels monitored by the UE when the network needs to transmit data to the UE at multiple frequencies; and receiving at the UE the downlink shared control channel in the control channel set and receiving HS-PDSCH data corresponding to respective frequencies according to the list of frequencies and the control information of the HS-PDSCH at respective frequencies.

To the accomplishment of the foregoing and related ends, the following description and annexed drawings set forth certain illustrative aspects and implementations. These are indicative of but a few of the various ways in which one or more aspects may be employed. Other aspects, advantages, and novel features will become apparent from the following detailed description when considered in conjunction with the annexed drawings.

DETAILED DESCRIPTION

Figure 1:
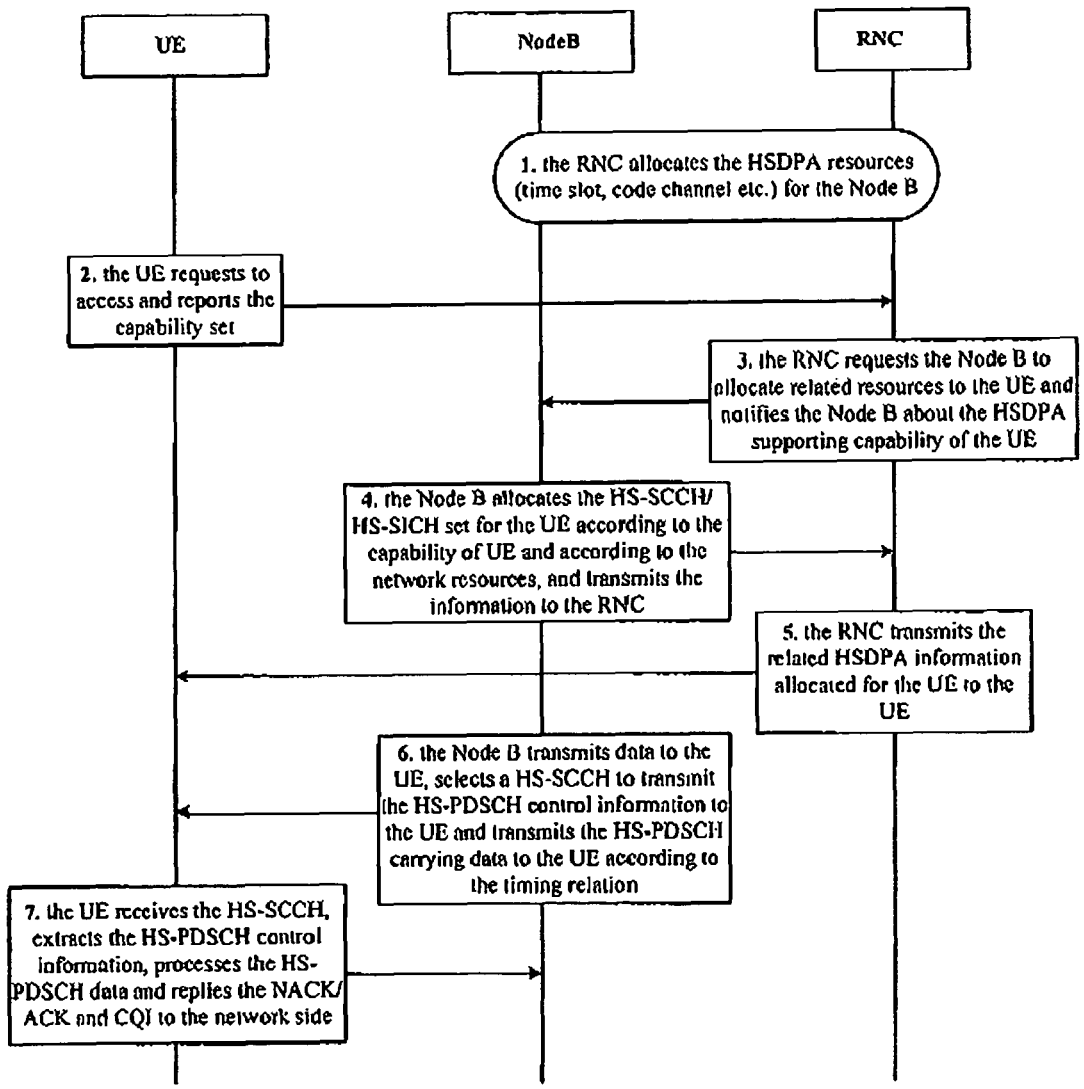
FIG. 1 illustrates an interaction flow of data transmission according to HSDPA technology between user equipment (UE) and a network at a single frequency.

The following discussion is now made with reference to the drawings, wherein like reference numerals are used to refer to like elements throughout. In the following description, for purposes of explanation, numerous specific details are set forth in order to provide a more thorough understanding. It may be evident, however, that the claimed subject matter may be practiced with or without these specific details. In other instances, well-known structures and devices are illustrated in block diagram, or other, form to facilitate the description.

As disclosed herein frequencies supported by user equipment ((UE) are numbered, the number of a frequency is transmitted to the UE through a $U_u$ interface message, a frequency indication is added in a downlink HS-SCCH, the UE is notified of control information related to the HS-PDSCH through the HS-SCCH corresponding to respective frequencies during a realtime communication and data and control information is transmitted and received. For an existing UE operating at a single frequency, the existing UE can continue to receive and process data such that an existing HSDPA solution remains compatible with the present method, while the control of HSDPA of multiply frequencies is supported by the present method.

Figure 2:
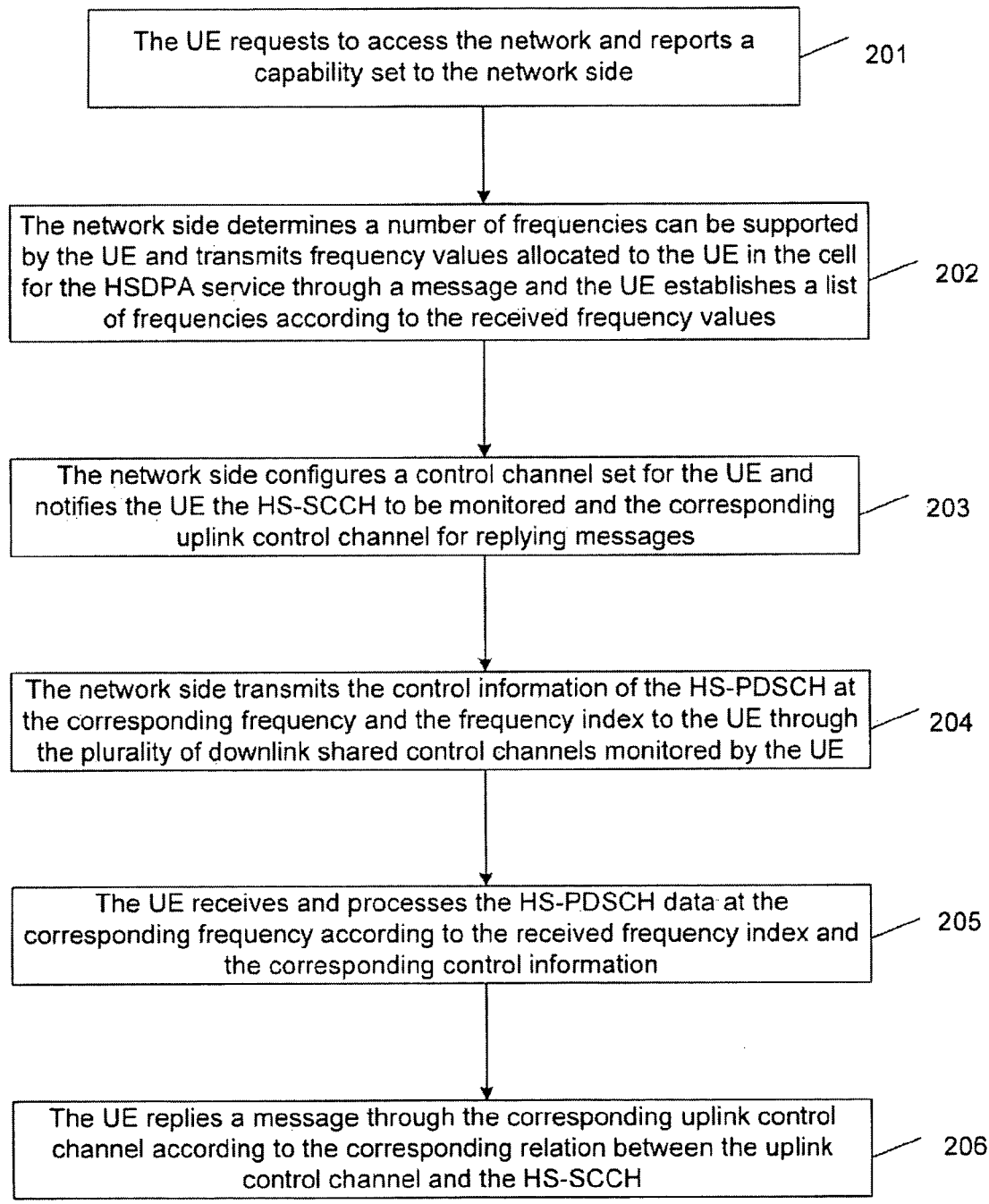
FIG. 2 is a flow chart illustrating an exemplary method for receiving multi-frequency data as described herein.

Turning to FIG. 2, a method for receiving multi-frequency data is illustrated. At 201, the UE makes a request to access a network and reports a capability set to the network side. For a multi-frequency HSDPA cell, when a UE supporting the HSDPA service accesses, the network side may determine a number of frequencies can be supported by the UE according to the reported capability set. The capability set mainly refers to the processing ability of the UE, comprising whether the UE can concurrently support the HSDPA service and receive a particular number of frequencies.

At 202, the network side determines a number of frequencies can be supported by the UE according to the reported capability set and transmits frequency values allocated to the UE in the cell for the HSDPA service through a message, and the UE establishes a list of frequencies according to the received frequency values. The network side numbers the frequencies allocated to the UE for the HSDPA service, transmits the frequency values according to an order of the serial numbers through the message, notifies the UE at which frequencies the HS-PDSCH can be received and the UE establishes a same list of frequencies with the network according to the received frequency values. It will be appreciated that the frequency value allocated to the UE for the HSDPA service can be represented by a 16-bit integer. For example, according to the 3GPP standard, supposing the working frequency of the UE is 2010.8 MHz, the corresponding absolute frequency value is 10054.

At 203, the network side configures a control channel set for the UE and notifies the UE the HS-SCCH to be monitored and the corresponding uplink control channel for replying to messages. By way of example, for the TDD system, such as the TD-SCDMA system, the uplink control channel corresponding to the HS-SCCH is the HS-SICH. For the FDD system, such as the WCDMA system, the uplink control channel corresponding to the HS-SCCH is the HS-DPCCH.

A pair of downlink shared control channel/uplink control channel is utilized for indicating one interaction of frequency control information. It will be appreciated that multiple pairs of downlink shared control channel/uplink control channel can be established in one cell, wherein these pairs of downlink shared control channel/uplink control channel can be established at one frequency or at multiple frequencies. The frequency at which the pair of downlink shared control channel/uplink control channel locates has no corresponding relation with the frequency at which the indicated HS-PDSCH locates e.g., the HS-SCCH established at the frequency f1 can indicate the HS-PDSCH established at the frequency f2.

The network side configures the UE through a physical channel reconfiguration message etc., specifically comprising the number of the downlink shared control channel/uplink control channel, the channelization code used by respective shared control channels, and for the TDD system, further comprising the midamble information, time slot information of the corresponding control channel etc. One UE may monitor a plurality of HS-SCCHs simultaneously, such as 24 HS-SCCHs.

At 204, when the network side needs to transmit data at a plurality of frequencies to the UE. it transmits the control information of the HS-PDSCH at the corresponding frequency and the frequency index to the UE respectively through the plurality of downlink shared control channels monitored by the UE.

In order to control the UE to receive data at a plurality of frequencies, a frequency indication is added in the HS-SCCH structure for indicating the index of the frequency at which the HS-PDSCH to be currently received by the UE locates. Specifically, several bits can be added in the HS-SCCH structure to represent the index of the frequency, or some bits in the HS-SCCH can be multiplexed to represent the index of the frequency, which will be illustrated in detail later.

During the data transmission process, the network side schedules the resources according to a scheduling algorithm, such as the proportional fairness scheduling algorithm, for example. When the network side has data to be transmitted to some UE, according to the scheduling algorithm, it selects the frequencies, the code channel at respective frequencies, the time slot of respective code channels and other control information such as the data length, coding and modulation solution, redundancy version etc. At the same time, it selects one HS-SCCH from the control channel set monitored by the UE, wherein the HS-SCCH comprises the index of the frequency at which the HS-PDSCH locates in addition to the length of the data carried on the HS-PDSCH, coding and modulation solution, number of code channels, number of time slots and redundancy version. When the UE receives the HS-SCCH, it searches the index of the frequency corresponding to the indicated frequency index, receives the HS-PDSCH at this frequency and decodes the data. One HS-SCCH indicates transmission information related with data at one frequency. Therefore, when the network side transmits data to the same UE at a plurality of frequencies, a plurality of HS-SCCHs are needed to indicate the control information of the HS-PDSCH at the corresponding frequency and the index of the frequencies respectively. The index of the frequency may be the FDD frequency or the TDD frequency.

At 205, the UE receives and processes the HS-PDSCH data at the corresponding frequency according to the received frequency index and the corresponding control information. The UE obtains the corresponding working frequency by searching the list of the frequencies according to the received frequency index; then it receives and processes the HS-PDSCH data at the corresponding frequency according to the received control information.

At 206, the UE replies with a message through the corresponding uplink control channel according to the corresponding relation between the uplink control channel and the HS-SCCH. The UE receives and processes the HS-PDSCH according to the control information on the HS-SCCH and replies the ACK/NACK and CQI to the network side through the HS-SICH or the HS-DPCCH corresponding to the HS-SCCH according to the decoding of the received data and the measurement of the channel and the network side controls the subsequent transmission of data to the UE according to the information.

In one example, the HS-SCCH structure is modified and a frequency indication is added in the HS-SCCH in order to control the UE to receive data at a plurality of frequencies. This may, for example, be accomplished in one of two ways. In one technique several bits are added to represent the index of the frequency at which the current HS-PDSCH locates. For example, when 12 frequencies can be used to perform the HSDPA transmission in a cell, 4 bits are added in the HS-SCCH to indicate the frequency at which the current HS-PDSCH locates. In another technique, when resources are allocated to the UE supporting multi-frequency HSDPA and the SF allocated to the UE at respective time slots and respective frequencies is 1, some bits in the HS-SCCH can be multiplexed to represent the index of the frequency. For example, the field of the channelization-code-set information in the HS-SCCH is used to represent the index of the frequency at which the HS-PDSCH to be received locates.

Figure 3:
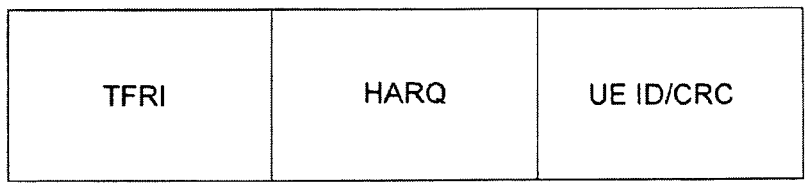
FIG. 3 is a schematic diagram illustrating a structure of a HS-SCCH before being coded.

A detailed illustration of the two frequency indications is given as follows:

1. Several bits are added to represent the index of the frequency:

FIG. 3 illustrates a structure of a HS-SCCH before being coded. It comprises 3 parts which are TFRI (Transport Format and Resource Indicator), HARQ (Hybrid Automatic Repeat Request) information and UE ID (User Equipment Identification)/CRC (Cyclic Redundancy Check) respectively wherein after the XOR computation is performed on the UE ID and the CRC, the result takes 16 bits in the HS-SCCH, and respective parts comprise information as illustrated in the following table.

| | |
|---|---|
| TFRI | Channelisation-code-set information: 8 bits |
| | Time slot information: 5 bits |
| | Modulation scheme information: 1 bit |
| | Transport-block size information: 6 bits |
| HARQ information | Hybrid-ARQ process information: 3 bits |
| | Redundancy version information: 3 bits |
| | New data indicator: 1 bit |
| | HS-SCCH cyclic sequence number (HSCN): 3 bits |
| UE-ID | UE ID: 16 bits |
| CRC | CRC: 16 bits |

As discussed, several bits can be added (for example, 4 bits are added for a cell with 12 frequencies) in the HS-SCCH to represent the frequency index (FID).

Figure 4:
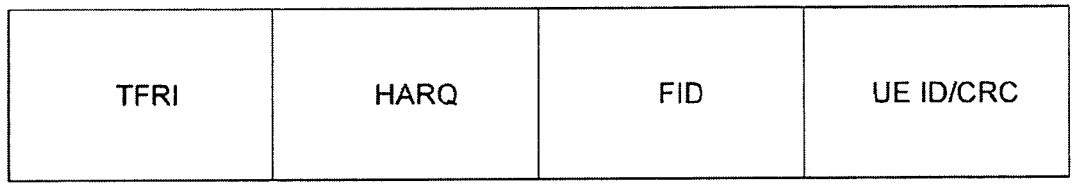
FIG. 4 is a schematic diagram illustrating a structure of a HS-SCCH with a frequency index added as described herein.

FIG. 4 is an example illustrating a structure of a HS-SCCH with a frequency indicator bit (FID field) added. In this example, the FID field is placed after the HSCN of the HS-SCCH. Of course, it may be placed after another field as required.

Figure 5:
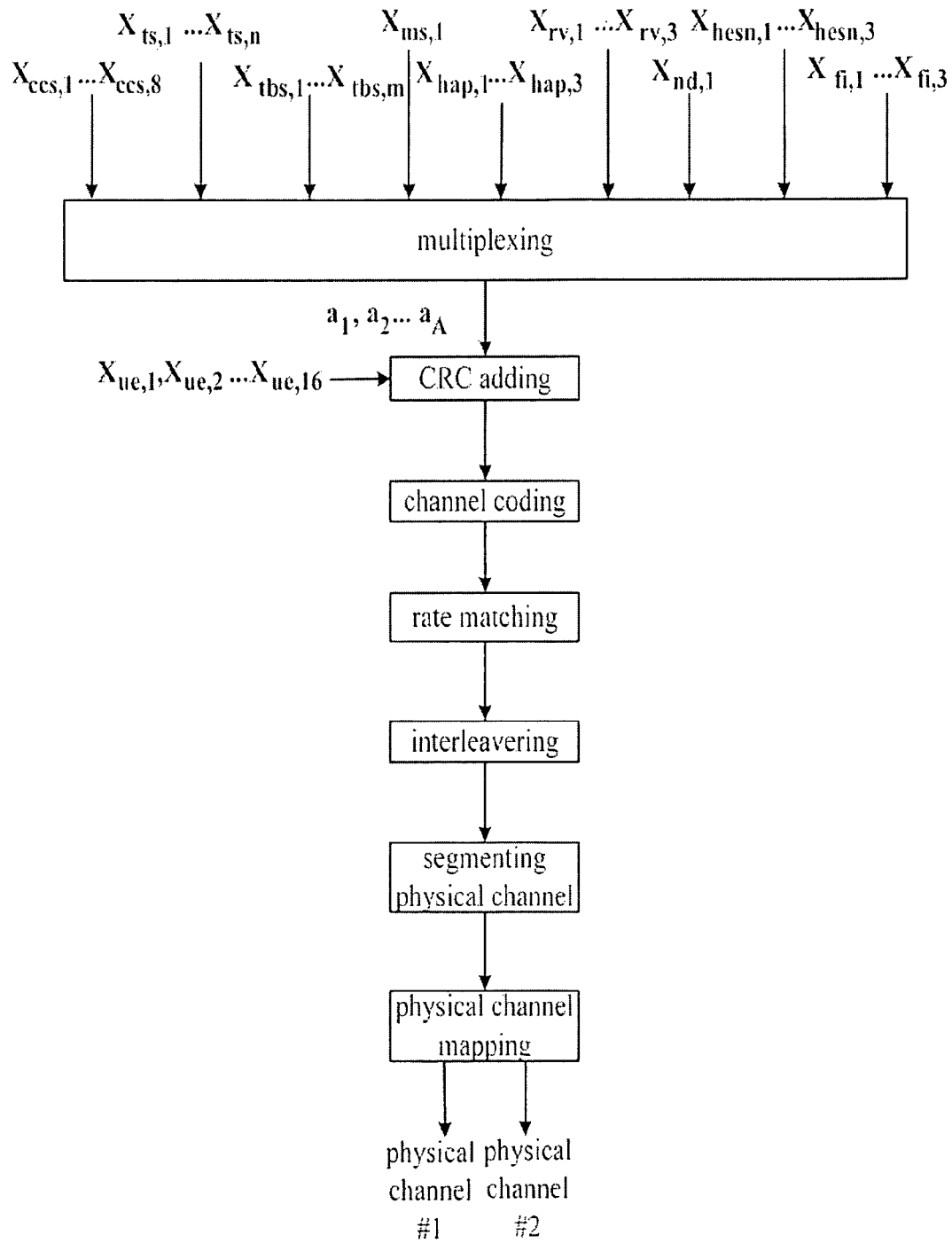
FIG. 5 is a flow chart illustrating coding and multiplexing of a HS-SCCH with a frequency indicator added.

FIG. 5 is a flow chart illustrating a coding and multiplexing of a HS-SCCH with a frequency indicator added. The channelization-code-set bit is represented by $x_{ccs,1}, x_{ccs,2}, \ldots, x_{ccs,3}$, the time slot information bit is represented by $x_{ts,1}, x_{ts,2}, \ldots, x_{ts,n}$, the modulation scheme information bit is represented by $x_{ms,1}$, the transport-block size is represented by $x_{tbs,1}, x_{tbs,2}, \ldots, x_{tbs,m}$, the hybrid-ARQ process information is represented by $x_{hap,1}, x_{hap,2}, x_{hap,3}$, the redundancy version is represented by $x_{rv,1}, x_{rv,2}, x_{rv,3}$, the new data indicator is represented $x_{nd,1}$, the HS-SCCH cyclic sequence number is represented by $x_{hcsn,1}, x_{hcsn,2}, x_{hcsn,3}$, and the UE ID is represented by $x_{ue,1}, x_{ue,2}, \ldots, x_{ue,16}$ and:

1) The 16-bit CRC is performed on the cascade connection of the channelization-code-set information, time slot information, modulation scheme information, transport-block size information, hybrid-ARQ process information, redundancy version information, new data indicator, HS-SCCH cyclic sequence number information and the frequency point index;

2) a XOR computation is performed on the CRC check bits and the 16-bit UE ID and then the result is attached after the frequency index;

3) a channel coding is performed on the information bits with CRC added;

4) a rate matching is performed on the coded data;

5) an interleaving is performed on the bits obtained by the rate matching;

6) the interleaved bits are divided into different physical channel segment and then the segmented data are mapped onto two physical channels.

2. Some bits in the channelization-code-set information field are multiplexed to represent the frequency point index.

In the traditional HS-SCCH, the channelization-code-set information field is to represent a beginning channelization code number and an ending channelization code number of respective time slots allocated to the UE. As described herein, the meaning of the channelization-code-set information field is to be modified such that: when the HS-SCCH is used to transmit the control information to the UE supporting a single frequency HSDPA, this field represents the beginning channelization code number and the ending channelization code number of respective time slots allocated to the UE, and when the HS-SCCH is used to transmit control information to the UE supporting a multi-frequency HSDPA, this field represents the frequency index of the frequency controlled by the HS-SCCH while the traditional coding and multiplexing flow of the HS-SCCH remains unchanged.

For example, if there are 12 frequencies in a cell that can be used for the HSDPA transmission, merely the preceding 4 bits $x_{ccs,1}$, $x_{ccs,2}$, $x_{ccs,3}$, $x_{ccs,4}$ of the channelization-code-set information field in the HS-SCCH need to be used to represent the index of the frequency at which the HS-PDSCH locates and the last 4 bits of the channelization-code-set information field are set to 0.

Of course, the foregoing describes adding a frequency indicator in the HS-SCCH structure. With the change of the versions, the HS-SCCH structure will change accordingly but the above technique of adding a frequency indicator in the HS-SCCH structure can be applied to the subsequent versions of HS-SCCH.

As described herein, the network side should determine the number of frequencies that can be supported by the UE according to the capability set reported by the UE and transmit the frequencies for the HSDPA service allocated to the UE in the cell to the UE through a message. Therefore, the $I_{ub}$ (interface between Node B and RNC) message, $I_{ur}$ (interface between RNCs) message and the $U_u$ (interface between UE and UTRAN) message should be modified, which will be illustrated in detail in the following.

1. Modification of the $I_{ub}$ Message

A frequency list should be added in the related message replied from the Node B to the RNC at the $I_{ub}$. Messages influenced by the added frequency list comprise RADIO LINK SETUP RESPONSE, RADIO LINK RECONFIGURATION READY and RADIO LINK RECONFIGURATION RESPONSE. The frequency indicator INDEX carried on the HS-SCCH has a promissory relation with the HS-PDSCH Carrier List IE (information element): Freq_index=0 represents information on the first frequency point appearing in the HS-PDSCH Carrier List, Freq_index=1 represents information on the second frequency appearing in the HS-PDSCH Carrier List and the rest may be deduced by analogy.

2. Modification of the $I_{ur}$ Message

A frequency list should be added in the related message transmitted from the DRNC to the SRNC at the $I_{ur}$. Messages influenced by the added frequency list, comprise RADIO LINK SETUP RESPONSE, RADIO LINK RECONFIGURATION READY, and RADIO LINK RECONFIGURATION RESPONSE. The frequency indicator INDEX carried on the HS-SCCH has a predetermined relation with the HS-PDSCH Carrier List IE (information element): Freq_index=0 represents information on the first frequency appearing in the HS-PDSCH Carrier List, Freq_index=1 represents information on the second frequency appearing in the HS-PDSCH Carrier List and the rest may be deduced by analogy.

3. Modification of the $U_u$ message (comprising a capability reporting message of the UE and a message of allocating resources to the UE by the RNC).

A frequency list for the HSDPA allocated to the UE by the network should be transmitted to the UE at the $U_u$ and the frequency list added at $U_u$ can be placed in the IE Downlink HS-PDSCH Information. Messages influenced by the added frequency list comprise CELL UPDATE CONFIRM, RADIO BEARER RECONFIGURATION, RADIO BEARER RELEASE, PHYSICAL CHANNEL RECONFIGURATION, RADIO BEARER SETUP and TRANSPORT CHANNEL RECONFIGURATION etc. The frequency indicator INDEX carried on the HS-SCCH has a predetermined relation with the HS-PDSCH Carrier List IE: Freq_index=0 represents information on the first frequency appearing in the HS-PDSCH Carrier List, Freq_index=1 represents information on the second frequency appearing in the HS-PDSCH Carrier List and the rest may be deduced by analogy.

Figure 6:
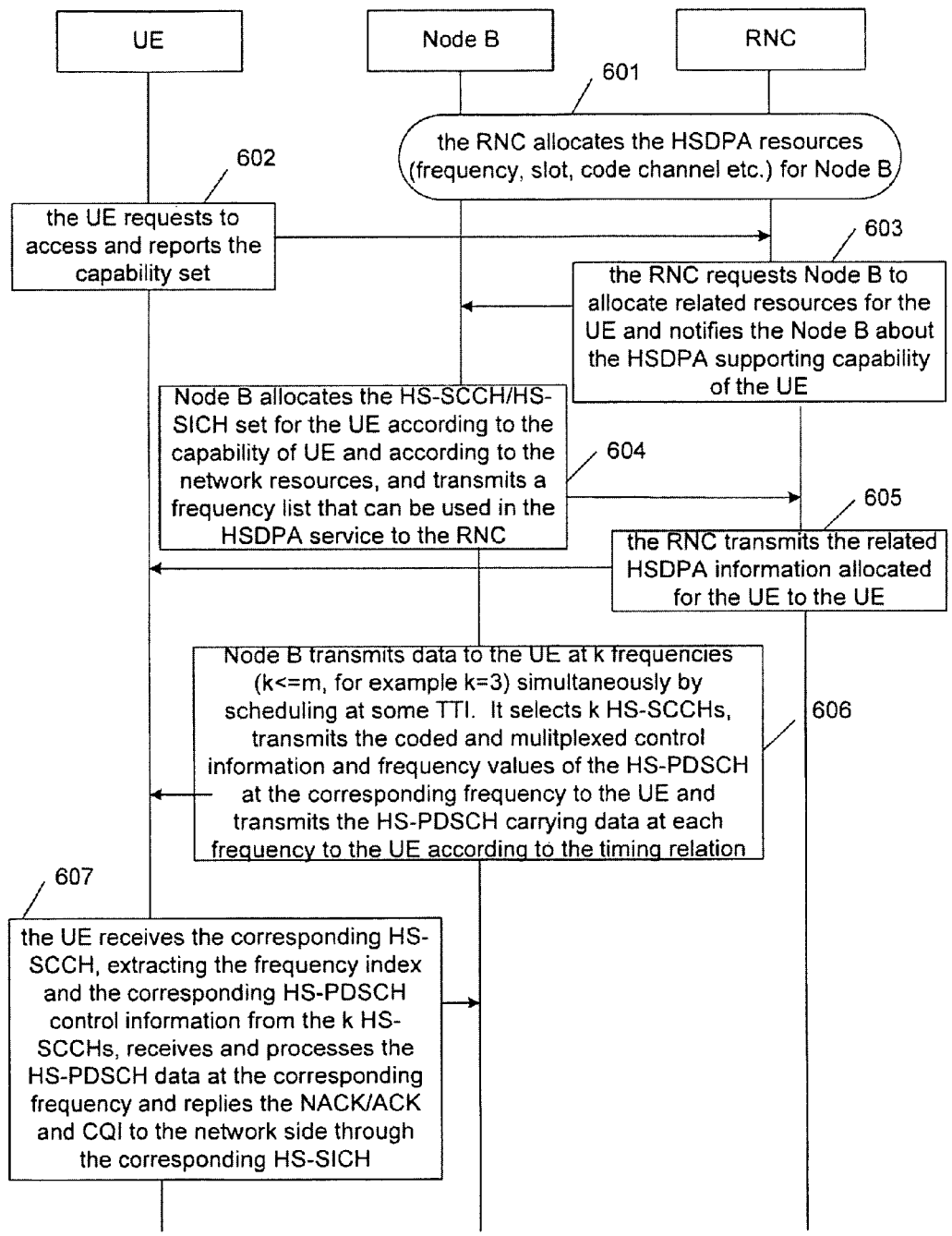
FIG. 6 is a schematic diagram illustrating interaction between the UE and the network side as described herein.

The interaction between the UE and the network side, described in detail with reference to the above modifications of messages and with an example of the TDD system, is discussed with regard to FIG. 6.

At 601, the RNC configures resources related to HS-PDSCH/HS-SCCH/HS-SICH (comprising frequency point, code channel, time slot and midamble etc) for the Node B according to the network, planning.

For the simplicity of description, it is supposed that there are 6 frequencies in the cell that can be used for the HSDPA service transmission, which are f1, f2, f3, f4, f5 and f6, but these are merely exemplary in nature and not to be interpreted in a limiting sense.

At 602, when the UE supporting multi-frequency (for example 6) HSDPA accesses the network, it reports its capability to the network side through related messages (such as RRC connection setup request).

At 603, when the RNC at the network side determines that access is allowed, it transmits the capability of the UE to Node B and requests Node B to allocate resources to the UE, wherein the resources comprise the HS-SCCH/HS-SICH set to be monitored by the UE and a list of the frequencies allocated to the UE for the HSDPA service etc.

At 604, Node B transmits the HS-SCCH/HS-SICH set allocated to the UE and a list of the frequencies that may be allocated to the UE for the HSDPA service to the RNC according to the capability level of the UE.

At 605, the RNC transmits the HS-SCCH/HS-SICH set allocated to the UE and the list of the frequencies that may be allocated to the UE for the HSDPA service to the UE.

The Node B and the UE have the same frequency list. The frequencies in the list can be given serial numbers according to their order of appearing in the message.

Suppose, for example, that Node B thinks the current 6 frequencies can be used for the HSDPA service transmission and the order of the 6 frequencies appearing in the message replied from the Node B to the RNC is f1, f2, f3, f4, f5 and f6, the frequency indexes corresponding to the 6 frequencies are 0, 1, 2, 3, 4 and 5 respectively.

At 606, during the realtime communication, when the Node B schedules at some time that k frequencies (k<=m, for example k=3) may be used to transmit data to the UE concurrently, it selects k HS-SCCHs from the HS-SCCH/HS-SICH set monitored by the UE to indicate the HS-PDSCH information at the k frequencies and the indexes of the k frequencies in the frequency list respectively, transmits respective HS-SCCHs after being processed such as coded and multiplexed to the UE, maps the processed data onto the HS-PDSCH corresponding to respective frequencies according to the timing relation and transmits to the UE.

For example, suppose that at the current time point, the Node B adopts frequency f1, f2 and f3 to transmit data to the UE simultaneously and the indexes of f1, f2 and B are 0, 1 and 2 respectively according to the former frequency list. Suppose that the 3 HS-SCCHs selected by the Node B in the HS-SCCH/HS-SICH set monitored by the UE are HS-SCCH0, HS-SCCH1 and HS-SCCH2 respectively and the 3 HS-SCCHs are for indicating the related control information of the HS-PDSCH on the frequency f1, f2 and f3, the index 0 of the frequency f1 is comprised in the HS-SCCH0, the index 1 of the frequency f2 is comprised in the HS-SCCH1, and the index 2 of the frequency f3 is comprised in the HS-SCCH2.

At 607, the UE monitors the HS-SCCHs in its HS-SCCH/HS-SICH set at the same time and when it receives the k HS-SCCHs, it decodes the channels, obtains the indexes of the k frequencies carrying the HS-PDSCH, finds the corresponding frequencies in the frequency list according to the indexes, receives the HS-PDSCH at the corresponding frequency and decodes the data respectively. The UE then transmits the reply message through the HS-SICH corresponding to the HS-SCCH to the Node B. Thus the UE and the network finish the transmission and receiving of data and the control information interaction.

For example, after the UE receives the HS-SCCH0, HS-SCCH1 and HS-SCCH2, it performs the decoding processing respectively and obtains the frequency indexes 0, 1 and 2 and the related control information of the HS-PDSCH at the corresponding frequencies with the index of 0, 1 and 2, searches the frequency list and obtains the corresponding frequency f1, f2 and f3. When the UE knows the network side has data to be transmitted to it at the frequency f1, f2 and f3 concurrently, it receives and processes the data at the corresponding frequencies according to the known frequency indexes and the control information of the HS-PDSCH at the corresponding frequency.

The above method for supporting the receiving of the multi-frequency data in the HSDPA service is mainly aimed at the TDD (such as the TD-SCDMA) system. For the FDD (such as the WCDMA) system, the uplink control channel corresponds to the uplink shared control channel HS-SCCH is HS-DPCCH. When the WCDMA system adopts multiple frequencies to perform the HSDPA service, it can adopt the above technique to indicate the HS-PDSCH frequencies.

The list of frequencies for HSDPA service transmission is added in related messages of $I_{ub}$ interface, $I_{ur}$ interface and $U_u$ interface, the frequency index indication information is added in the downlink HS-SCCH, Node B and UE maintain the same list of frequencies, and during the data transmission, Node B at the network side indicates the UE to receive and process the HS-PDSCH data at the corresponding frequency according to the frequency index in the downlink HS-SCCH so that the scheduling of resources is realized flexibly, the UE working at multiple frequencies promotes receiving data at respective frequencies.

It will be appreciated that, as used in this application and appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Additionally, while one or more methods are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising.".

The invention claimed is:

1. A method for receiving multi-frequency data in a high speed downlink access service, comprising:
   allocating, at a network side, a plurality of control channel sets each including a downlink shared control channel and an uplink control channel and a list of frequencies used in a High Speed Downlink Packet Access (HSDPA) service in a current cell for a User Equipment (UE) according to capability of the UE and resource of the network, when the UE accesses the network;
   transmitting, at the network side, control information of High Speed Physical Downlink Shared Channels (HS-PDSCHs) each corresponding to one of the frequencies in the list to the UE through a respective downlink shared control channel monitored by the UE, before transmitting the HS-PDSCHs each at the respective corresponding frequency to the UE; and
   transmitting the HS-PDSCHs each at the respective corresponding frequency to the UE, wherein the UE receives and processes the HS-PDSCHs data according to the list of frequencies and the control information of the HS-PDSCHs at the corresponding frequencies.

2. The method of claim 1, wherein frequency indexes each corresponding to a respective frequency are carried in a respective downlink shared control channel for being transmitted to the UE, and the UE obtains a respective frequency from the list of frequencies according to the frequency indexes.

3. The method of claim 2, wherein each frequency index is represented by a predetermined number of bits added in a structure of a respective downlink shared control channel.

4. The method of claim 2, wherein if a spreading factor of a High Speed Physical Downlink Shared Channel (HS-PDSCH) allocated to the UE at a time slot and frequency is 1, a respective frequency index is represented by multiplexing a part of bits of a channelization code set information field in a structure of a respective downlink shared control channel.

5. The method of claim 1, wherein, allocating a plurality of the control channel sets comprises:

determining, at the network side, frequencies supported by the UE according to capability reported by the UE at the time the UE accesses the network;

transmitting frequency values allocated to the UE in the cell for the HSDPA service through a message, among the determined frequencies, wherein the list of frequencies is established by the UE according to the received frequency values; and allocating, at the network side, the control channel sets each corresponding to a respective frequency value for the UE to monitor.

6. The method of claim 5, wherein transmitting frequency values comprises:

numbering, at the network side, the frequency values allocated to the UE in the cell for the HSDPA service; and transmitting, at the network side, the frequency values according to an order of the numbering through the message, wherein the list of frequency, identical to a list of frequencies at the network side, is established by the UE according to the received frequency values.

7. The method of claim 1, further comprising:

acknowledging, by the UE, through uplink control channels each corresponding to a respective downlink shared control channel according to a respective relation between an uplink control channel and a downlink shared control channel.

8. The method of claim 1, wherein frequency indexes each corresponding to a respective frequency are carried in a respective downlink shared control channel for being transmitted to the UE, each frequency index is a Frequency Division Duplex (FDD) frequency or a Time Division Duplex (TDD) frequency.

9. The method of claim 1, when used with a Time Division Duplex (TDD) system, the uplink control channel is a High Speed Shared Information Channel (HS-SICH); and when used with a Frequency Division Duplex (FDD) system, the uplink control channel is a High Speed Dedicated Physical Control Channel (HS-DPCCH).

* * * * *